United States Patent [19]
Doerfler

[11] 3,812,678
[45] May 28, 1974

[54] CONTROL VALVE
[75] Inventor: Roger E. Doerfler, Detroit, Mich.
[73] Assignee: Kelsey-Hayes Company, Romulus, Mich.
[22] Filed: Feb. 5, 1973
[21] Appl. No.: 329,396

[52] U.S. Cl.................................. 60/591, 137/505
[51] Int. Cl.......................................... F16k 31/363
[58] Field of Search....................... 60/591; 137/505

[56] References Cited
UNITED STATES PATENTS
3,423,936  1/1969  Stelzer.............................. 137/505
3,477,232  11/1969  Porter.................................. 60/591
FOREIGN PATENTS OR APPLICATIONS
1,318,026  1/1962  France.............................. 137/489

Primary Examiner—Edgar W. Geoghegan
Assistant Examiner—A. M. Zupcic
Attorney, Agent, or Firm—Harness, Dickey & Pierce

[57] ABSTRACT

A fluid pressure control valve for controlling the flow of fluid from a fluid source to some predetermined destination, the valve including first and second chambers, an inlet communicating fluid from the source to the first chamber and an outlet communicating fluid from the first chamber to the destination, means including a movable valve member within the first chamber operative to reduce the fluid pressure transmitted to the outlet relative to the inlet, means sealingly engaging the valve member for preventing fluid from passing from the first chamber into the second chamber, and means for preventing any fluid passing around or through the sealing means from the first chamber into the second chamber from affecting normal operation of the valve member.

21 Claims, 6 Drawing Figures

PATENTED MAY 28 1974 3,812,678

CONTROL VALVE

SUMMARY OF THE INVENTION

The present invention relates generally to brake pressure proportioning valves for vehicular brake systems, and more particularly, to an improved valve structure of the type generally shown in U.S. Pat. No. 3,423,936 assigned to the assignee of the present invention.

The proportioning valve structure disclosed in the above identified patent incorporates a reciprocal piston member having a dynamic seal slidably engaged with the outer periphery thereof and functioning generally to prevent brake fluid from passing downwardly between the outer periphery of the piston member and the seal into the lower end of the proportioning valve housing. It has been found, however, that under certain circumstances, the aforementioned seal may possibly become worn, or otherwise partially ineffective, and an excess amount of brake fluid will thus pass into the lower end of the valve housing, and in the event that an excessively large amount of fluid accumulates beneath the valve piston, the piston may be rendered inoperative in accomplishing its normal fluid proportioning function. The present invention is directed toward an improvement over the aforesaid valve structure which obviates the possibility of the valve piston becoming adversely affected in the above described manner and thus assures that the proportioning valve unit will have a long and effective operational life. It is accordingly a general object of the present invention to provide a new improved proportioning valve for use in vehicular hydraulic brake systems.

It is a more particular object of the present invention to provide a new and improved proportioning valve which obviates the aforementioned shortcomings of similar type valve structures heretofore known and used.

It is still a more particular object of the present invention to provide a new and improved proportioning valve which is provided with means for causing any fluid which bypasses the piston seal to be forced back through the associated seal so that such fluid will not accumulate beneath the piston member.

It is another object of the present invention to provide a new and improved proportioning valve, of the above character, wherein the means for forcing fluid back past the piston seal is in the form of a cellular media comprising a plurality of closed cells containing a compressible gas.

It is still another object of the present invention wherein the media containing the compressible gas is in the form of a resilient deformable bladder or enclosure containing a volume of gas.

It is yet another object of the present invention to provide a new and improved proportioning valve, of the above described type, which is of a simple design, is economical to manufacture, and will have a long and effective operational life.

Other objects and advantages of the present invention will become apparent from the following description taken in conjunction with the accompanying drawing.

DETAILED DESCRIPTION OF THE PREFERRED EMBODIMENTS

Figure 1:
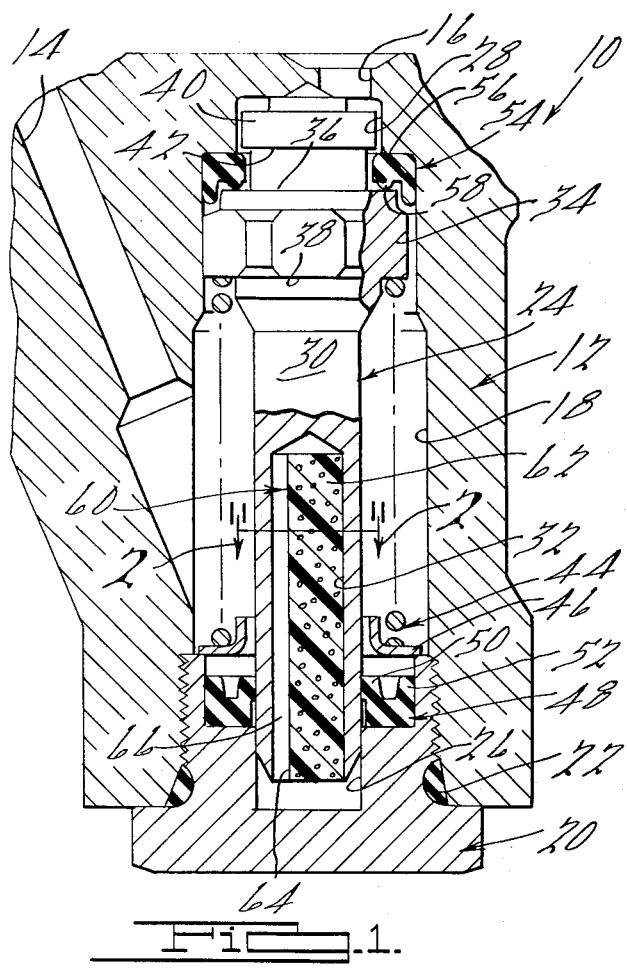
FIG. 1 is an enlarged vertical cross-sectional view of the proportioning valve incorporating the principles of the present invention.

Referring now in detail to the drawing and in particular to FIG. 1 thereof, a proportioning valve 10, in accordance with one preferred embodiment of the present invention, is shown generally as comprising an external housing 12 that is provided with an inlet passage or bore 14 which is communicable with the master cylinder of the associated brake system (not shown) and with an outlet passage or bore 16 which is adapted to be communicable with the rear brake cylnders of the associated vehicle (also not shown). The housing 12 is formed with a central bore shaped chamber 18 which is closed at the lower end thereof by means of a cap or closure member 20. As illustrated, the closure member 20 is threadably received within the lower end of the bore or chamber 18 and is provided with a suitable o-ring seal or the like 22 to provide a fluid tight seal between the housing 12 and cap 20. Disposed within the bore 18 is a proportioning valve means or piston member, generally designated by the numeral 24. The piston member 24 is reciprocally mounted within the bore 18 and has a lower end thereof slidably received within a blind bore 26 formed within the cap 20, with the upper end of the piston member 24 being slidably disposed within an upper blind bore 28 formed at the upper end of the housing 12. The piston member 24 incldes a lower cylindrical portion 30 which is formed with an interior blind cavity or chamber 32 exposed at a lower end thereof to the blind bore 26. The piston member 24 is also formed with a radially outwardly extending annular flange 34 at the upper end thereof which defines upper and lower generally radial shoulders 36 and 38, respectively. Disposed above the flange 34 on the piston member 24 is a valve head or shoulder 40 which is of a generally rounded annular configuration and defines an annular valve seat or face 42 on the lower side thereof.

The piston member 24 is normally biased in an upwardly direction by means of a helical coil spring 44 which extends around the piston member 24, as illustrated. The upper end of the spring 44 engages the shoulder 38, while the lower end of the spring 44 bears against and is supported by means of an annular spring cup 46 which is in turn supported upon the upper end of the cap 20. Disposed directly below the spring cup 46 is a cup type fluid seal, generally designated by the numeral 48. The fluid seal 48 comprises inner and outer flange portions 50 and 52 which are adapted for sealing engagement with the outer periphery of the piston member 24 and the inner periphery of the cap member 20. Generally speaking, the fluid seal 48 functions to prevent downward movement of brake fluid from the bore or chamber 18 into the lower end of the blind bore 26, as will hereinafter be described.

Disposed within the upper end of the bore or chamber 18 is an elastomeric annular valve member 54. The valve member 54 is formed with an upper shoulder 56 which is adapted for engagement with the valve seat or surface 42 of the valve head 40, while the lower or underside of the valve member 54 is formed with a plurality of circumferentially spaced, downwardly projecting bosses, generally designated by the numeral 58, adapted for engagement with the shoulder 36 formed around the upper end of the flange portion 34. A more detailed description of the construction of the valve member 54, as well as the various other components incorporated in the proportioning valve 10, will be found in U.S. Pat. No. 3,423,936 which is incorporated herein by reference in the descriptive portion of this specification. Additionally, although a detailed description of the overall operation of the valve 10 will be found in the aforesaid patent, briefly, the valve 10 operates as follows. Normally, a fluid path is provided open between the inlet passage 14, bore or chamber 18 and outlet passage 16. The reason for this is that the spring 44 normally biases the piston member 24 upwardly, whereby the shoulder 36 is engaged with the plurality of bosses 58, whereby to permit fluid to pass from the bore or chamber 18 between the bosses 58 into the blind bore 28 and thereafter to the outlet passage 16. This path remains open until the fluid pressure delivered to the housing 12 from the master cylinder of the associated brake system (not shown) attains a predetermined level. At that time, the piston member 24 will be biased downwardly, whereby the seat or face 42 will engage a shoulder 56 of the valve member 54. The level of pressure at which this occurs is, of course, dependent upon the effective force of the spring 44 compared to the effective area of the piston member 24 acted upon by the inlet fluid pressure in a direction opposing the force of the spring 44. After the valve head 40 thus closes against the valve member 54 and the fluid pressure at the inlet passage 14 is further increased by the associated master cylinder, the increased level of fluid pressure will act against the piston member 24 over an effective area of the piston member 24 such that an upwardly directed force is exerted thereagainst, assisting the spring 44 and tending to reopen the valve to deliver at least a portion of this increased fluid pressure to the outlet passage 16, and this opening and closing of the valve or fluid modulation will continue, whereby fluid will be selectively proportioned to the rear brake system of the associated vehicle, as described in detail in the aforesaid U.S. Pat. No. 3,423,936.

As previously mentioned, the seal 48 normally functions to prevent the flow of fluid from the bore or chamber 18 into the blind bore 26 at the lower end of the valve 10; however, due to the fact that the seal 48 is subject to wear, it is possible that after an extended period of time, fluid may leak downwardly past the seal 48 during a brake application, which fluid will accumulate at the bottom of the blind bore 26 and in so doing, will compress air which normally occupies the cavity 32. When the pressure from the master cylinder is relieved, the air which was compressed by the leading brake fluid will attempt to expand and force the leaked brake fluid upwardly past the seal 48 back into the bore or chamber 18. While this operation is considered to be failsafe in most instances since the fact that any fluid leaking past the seal 48 will be automatically returned to the brake system, under certain circumstances, it is possible that the entire cavity 32 and blind bore 26 may be filled with hydraulic brake fluid, in which case the piston member 24 will become "locked up" and hence be rendered inoperable in properly proportioning fluid from the inlet passage 14 to the outlet passage 16 and hence from the associated master cylinder to the rear brake system of the associated vehicle. In order to obviate this possibility, the proportioning valve shown in the aforementioned U.S. Pat. No. 3,423,936, has been modified in accordance with the principles of the present invention.

Figures 2, 3:
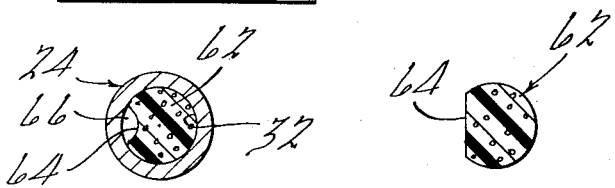
FIG. 2 is a transverse cross-sectional view taken substantially along the line 2—2 of FIG. 1.
FIG. 3 is a transverse view similar to FIG. 2 and illustrates the compressible media which is incorporated in the proportioning valve of the present invention in its preinstalled configuration.

More particularly, it has been discovered that if some means is provided interiorly of the cavity 32 to prevent all of the air which is normally contained therein from being displaced by fluid which leaks past the seal 48 during a series of brake operations, the aforementioned locking up of the piston member 24 is prevented, since there is always some air within the cavity 32 which will be compressed as subsequent fluid passes into the cavity 32, which compressed air will then tend to expand when the master cylinder pressure is relieved, whereby to cause such fluid to flow back past the seal 38 into the bore or chamber 18. Although it is contemplated that such air or gas retaining means within the cavity 32 may take any one of a number of forms, such means, in accordance with one preferred embodiment of the present invention, is shown in the form of a generally cylindrically shaped gas retaining element, generally designated by the numeral 62, which is nestingly received within and is generally co-extensive of the cavity 32. The element 62 is preferably, although not necessarily, fabricated or a cellular or foam-like material comprising a multiplicity of gas cells and which is resilient and deformable in character upon being subjected to the predetermined fluid pressure level. The material is of closed cell character and may be of various known natural and synthetic compositions, with its main requirement being that it is compatible with the brake fluid normally utilized in vehicular braking systems. Preferably, although not necessarily, the material from which the element 62 is fabricated contains a volume of entrapped gas equivalent to approximately 60 to 70 per cent of the overall volume of the element 62. As illustrated in FIG. 3, the element 62 is preferably of a generally cylindrical configuration and has a generally flat face 63 formed along one side thereof. The diameter of the element 62 is preferably slightly larger than the diameter of the cavity 32, whereupon the element 62 will be slightly deformed upon insertion therewithin. Due to the slightly oversize configuration of the element 62, when the same is disposed within the cavity 32, the face 63 assumes a generally arcuate configuration and defines with the inner periphery of the cavity 32, an elongated passageway 66 that is co-extensive of the element 62. The reason for the passageway 66 is to permit fluid which may pass by the seal 48 to flow upwardly along the entire length of the cavity 32, with the result that upon application of the master cylinder of the associated brake system, the increased fluid pressure condition which results from the brake application will act upon the entire length of the element 62, instead of merely upon the lower end thereof exposed to the fluid within the blind bore 26. Accordingly, the entire length of the element 62 will be effective in being compressed upon the application of an increased fluid pressure within the cavity 32. By virtue of the multiplicity of gas cells within the element 62, the possibility of brake fluid occupying the entire volume of the cavity 32 is entirely obviated so that a predetermined quantity of gas or air will always occupy the cavity 32 and thus will always be there to be compressed in the event fluid leaks downwardly past the seal 48 into the cavity 32. Accordingly, whenever fluid leaks into the blind bore 26 or in any portion of the cavity 32 not occupied by the element 62, when the pressure from the master cylinder is relieved, gas which was compressed by the leaking brake fluid will expand and cause such leaked brake fluid to be forced upwardly back into the bore or chamber 18, whereby to insure for a long and effective operational life for the valve 10.

Figure 4:
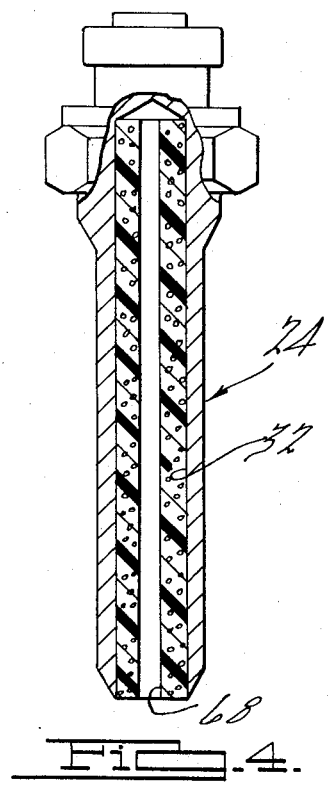
FIG. 4 is an enlarged side elevational view, partially broken away, of the proportioning piston incorporated in the present invention, as shown in operative association with a modified embodiment of the compressible media provided therein.

FIG. 4 illustrates a slightly modified embodiment of the present invention wherein the element 62, instead of being formed with one face thereof cut away as shown in FIGS. 1 through 3, has the interior thereof formed with an elongated central bore or passageway 68 which functions to permit fluid to pass upwardly along the entire length of element 62 so as to act over the entire length thereof in the manner hereinabove described.

Figure 5:
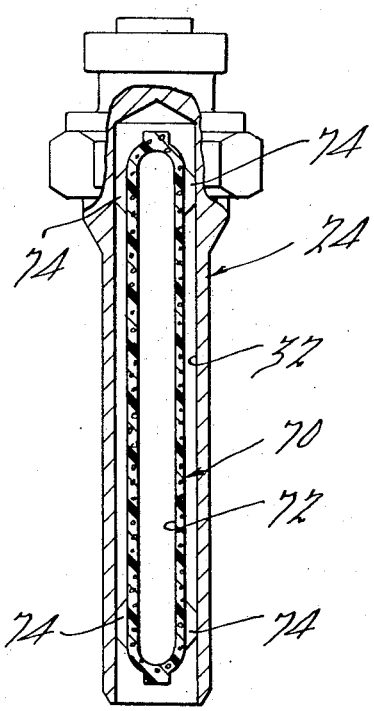
FIG. 5 is a view similar to FIG. 4 and illustrates still another embodiment of the present invention.
Figure 6:
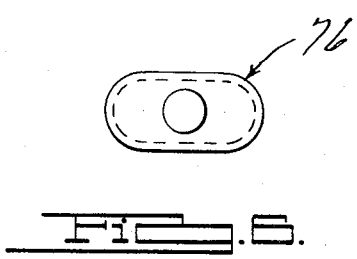
FIG. 6 is a transverse cross-sectional view of another compressible media structure in accordance with the principles of the present invention.

FIG. 5 illustrates still another embodiment of the present invention wherein the means within the cavity 32 for positively maintaining gas or air within the cavity 32 is provided by an enclosure element, generally designated by the numeral 70, which defines a closed volume gas chamber 72 interiorly thereof. The enclosure element 70 is preferably fabricated of a resilient deformable elastomeric material which may be blown or rotationally molded in a manner well known in the art. Preferably the chamber 72 defined therewithin is hermetically sealed and has an internal gas pressure of approximately 1 to 1.5 atmospheres. In operation, upon an increasing fluid pressure interiorly of the cavity 32, the enclosure element 70 will be deformed, thereby compressing the air or other gas located therewithin. At such time as the fluid pressure is relieved, the compressed gas will expand causing the enclosure element 70 to resume its normal configuration as shown in FIG. 5, whereby to force any fluid disposed in the cavity 32 back past the seal 48 into the bore or chamber 18. The enclosure member 70 may assume various configurations and sizes, with the embodiment shown in FIG. 5 being generally circular in cross section and slightly smaller in diameter than the diameter of the cavity 32. Means in the form of a plurality of outwardly projecting bosses 74 may be provided on the outer periphery of the element 70 and adapted for frictional engagement with the interior of the cavity 32 for positively retaining the element 70 therewithin. Alternatively, the element 70 may be of a cross-sectional size different from that of the cavity 32. For example, the element could be as represented by the element 76 in FIG. 6 which is of a generally oblong configuration in cross section and adapted to be frictionally retained within the generally circular or other shaped cavity 32 within the piston member 24. In any case, it is important that some passageway be provided between the outer periphery of the element 70 or 76 and the inner periphery of the associated cavity 32, whereby to provide for fluid communication along the entire length of the element such that an increase in fluid pressure within the cavity 32 will be applied over the entire length of the enclosure element.

It will be seen from the foregoing that the present invention provides a novel means for retaining a compressible gas within the piston member 24 so that such gas will always be available to be compressed in the event fluid leaks past the seal 48 into the blind bore 26 or cavity 32, which compressed gas will cause such fluid to be forced back past the seal 48 at such time as the master cylinder pressure of the associated braking system is relieved. Accordingly, the principles of the present invention will render the associated proportioning valve operable virtually indefinitely, even though the seal 48, for some reason or another, becomes worn. Thus, the proportioning valve 10 provided with the principles of the present invention will have a long and effective operational life.

While it will be apparent that the preferred embodiments illustrated herein are well calculated to fulfill the objections above stated, it will be appreciated that the present invention is susceptible to modification, variation and change without departing from the scope of the invention.

I claim:

1. A proportioning valve for use in a vehicle brake system including a master cylinder providing a source of pressurized hydraulic fluid for the valve and operative to actuate associated brake cylinders, said valve including first and second fluid chambers,
an inlet communicating fluid from said master cylinder to said first chamber and an outlet communicating fluid from said first chamber to said brake cylinders,
means including a movable valve member within said first chamber operative to reduce the fluid pressure transmitted to said outlet relative to said inlet,
said valve being normally open and being movable toward a closed position under the influence of an increase in fluid pressure at said outlet,
sealing means for preventing fluid from passing from said first chamber into said second chamber, and
means separated from said inlet by said sealing means for preventing any fluid passing around or through said sealing means from said first chamber into said second chamber from affecting normal operation of said valve member.

2. The invention as set forth in claim 1 wherein said last mentioned means is operable to cause fluid to flow from said second chamber back into said first chamber.

3. The invention as set forth in claim 1 wherein said last mentioned means comprises compressible means disposed in one of said chambers.

4. The invention as set forth in claim 3 wherein said compressible means is disposed in said second chamber.

5. The invention as set forth in claim 1 wherein said second chamber is disposed within said movable valve member.

6. The invention as set forth in claim 1 wherein said valve member comprises a reciprocal piston disposed within said first chamber, and which includes sealing means sealingly engageable with the outer periphery of said piston member and adapted to prevent fluid from flowing from said first chamber into said second chamber.

7. The invention as set forth in claim 6 wherein said inlet is communicable with said first chamber on one side of said sealing means and wherein said second chamber is disposed on the opposite side of said sealing means from said inlet.

8. The invention as set forth in claim 7 wherein said second chamber is disposed within said piston.

9. The invention as set forth in claim 1 wherein said last mentioned means comprises means for containing a compressible gas.

10. The invention as set forth in claim 9 wherein said means for containing a compressible gas comprises an enclosure containing a predetermined volume of a compressible gas.

11. The invention as set forth in claim 9 wherein said means for containing a compressible gas comprises a resilient deformable cellular material.

12. The invention as set forth in claim 8 wherein said piston is formed with a bore in one end thereof, and wherein said last mentioned means comprises a resilient deformable material disposed within said bore.

13. The invention as set forth in claim 12 wherein said material is of a closed cellular construction.

14. The invention as set forth in claim 13 which includes passageway means extending generally co-extensive of said material.

15. The invention as set forth in claim 14 wherein said passageway extends along one side of said material adjacent the periphery of said bore.

16. The invention as set forth in claim 14 wherein said passageway is disposed within said material.

17. The invention as set forth in claim 12 wherein said compressible material comprises a resilient deformable enclosure containing a preselected quantity of a compressible gas.

18. The invention as set forth in claim 12 which includes means for retaining said material within said bore.

19. The invention as set forth in claim 18 wherein said retaining means includes means projecting outwardly from the periphery of said material and adapted to frictionally engage the periphery of said bore.

20. The invention as set forth in claim 18 wherein said retaining means comprises said material being of a different cross-sectional size or shape than said bore.

21. The invention as set forth in claim 1 wherein said means for reducing the fluid pressure transmitted from said outlet relative to said inlet comprises a proportioning valve.

* * * * *